United States Patent
Yoshida

(10) Patent No.: US 12,110,969 B2
(45) Date of Patent: Oct. 8, 2024

(54) VALVE DEVICE

(71) Applicant: FUJIKOKI CORPORATION, Tokyo (JP)

(72) Inventor: Tatsuya Yoshida, Tokyo (JP)

(73) Assignee: FUJIKOKI CORPORATION, Tokyo (JP)

(*) Notice: Subject to any disclaimer, the term of this patent is extended or adjusted under 35 U.S.C. 154(b) by 0 days.

(21) Appl. No.: 18/466,550

(22) Filed: Sep. 13, 2023

(65) Prior Publication Data
US 2024/0003426 A1    Jan. 4, 2024

Related U.S. Application Data

(63) Continuation of application No. 17/299,593, filed as application No. PCT/JP2019/016649 on Nov. 28, 2019, now Pat. No. 11,796,067.

(30) Foreign Application Priority Data

Dec. 5, 2018 (JP) .................................. 2018-228363

(51) Int. Cl.
    *F16K 1/32* (2006.01)
    *F15D 1/04* (2006.01)
    (Continued)

(52) U.S. Cl.
    CPC ................ *F16K 1/32* (2013.01); *F15D 1/04* (2013.01); *F16K 1/06* (2013.01); *F16K 27/02* (2013.01); *F16K 11/044* (2013.01)

(58) Field of Classification Search
    CPC . F16K 11/04; F16K 1/32; F16K 27/02; F16K 1/06; F16K 1/04; F15D 1/04
    (Continued)

(56) References Cited

U.S. PATENT DOCUMENTS

| | | | |
|---|---|---|---|
| 1,116,689 A | * | 11/1914 | Gehrke ..................... F16K 1/04 |
| | | | 210/429 |
| 2,496,679 A | | 2/1950 | Saurer |

(Continued)

FOREIGN PATENT DOCUMENTS

| | | |
|---|---|---|
| CN | 107143659 A | 9/2017 |
| DE | 328845 C | 11/2020 |

(Continued)

OTHER PUBLICATIONS

PCT, International Search Report for the corresponding application No. PCT/JP2019/046649, dated Jan. 7, 2020, with English translation.

(Continued)

*Primary Examiner* — Jessica Cahill
(74) *Attorney, Agent, or Firm* — LUCAS & MERCANTI, LLP

(57) ABSTRACT

A valve device capable of reducing pressure loss is provided. The valve device is provided with a valve main body having a valve chamber in which a valve body is arranged, inflow outlets, and communication holes communicating the valve chamber and the inflow outlets, and a rectification member arranged in the communication hole. The communication hole has a bent portion where the center line of the communication hole is bent, and the rectification member is arranged in the bent portion and has a corner portion formed by an inner circumferential surface bent or curved at an angle larger than the angle of the bent portion.

12 Claims, 9 Drawing Sheets

(51) Int. Cl.
*F16K 1/06* (2006.01)
*F16K 11/044* (2006.01)
*F16K 27/02* (2006.01)

(58) Field of Classification Search
USPC ........................................................ 251/118
See application file for complete search history.

(56) References Cited

U.S. PATENT DOCUMENTS

| | | | | |
|---|---|---|---|---|
| 2,694,545 | A | * | 11/1954 | Steenbergh ......... F16K 31/1223 |
| | | | | 251/118 |
| 3,521,666 | A | * | 7/1970 | Scaramucci ............ F16K 27/02 |
| | | | | 137/454.2 |
| 4,074,700 | A | * | 2/1978 | Engle ................. F16K 31/0627 |
| | | | | 251/282 |
| 4,161,187 | A | * | 7/1979 | Bauer ................. F16K 27/0272 |
| | | | | 29/447 |
| 4,494,573 | A | | 1/1985 | Berte |
| 5,533,549 | A | * | 7/1996 | Sherman ............... F16K 27/067 |
| | | | | 137/557 |
| 5,918,856 | A | * | 7/1999 | Scharnowski ...... F16K 31/0658 |
| | | | | 251/129.15 |
| 7,987,871 | B2 | * | 8/2011 | Cho .................... F16K 31/0627 |
| | | | | 251/282 |
| 11,092,366 | B2 | * | 8/2021 | Mogi ..................... F25B 41/335 |
| 2002/0023682 | A1 | * | 2/2002 | Tokuda ............... F16K 31/1221 |
| | | | | 137/625.5 |
| 2010/0006787 | A1 | | 1/2010 | Nakata |
| 2012/0228531 | A1 | * | 9/2012 | Broderick ................. F16K 1/06 |
| | | | | 251/118 |
| 2017/0159610 | A1 | * | 6/2017 | Ehlig ...................... F16K 27/02 |

FOREIGN PATENT DOCUMENTS

| | | |
|---|---|---|
| JP | 2002-071033 A | 3/2002 |
| JP | 2002-098444 A | 4/2002 |
| JP | 2008-151348 A | 7/2008 |
| JP | 4576440 B2 | 7/2008 |
| JP | 2011-089732 A | 5/2011 |
| KR | 10-2002-0018012 A | 3/2002 |
| KR | 10-0499244 B1 | 3/2002 |
| KR | 10-2008-0034978 A | 4/2008 |

OTHER PUBLICATIONS

Extended European Search Report dated Aug. 4, 2022 for the corresponding European application No. 19893065.3.
Office Action dated Aug. 14, 2022 for the corresponding Korean application No. 10-2021-7017952, with English translation.
Office Action dated Oct. 9, 2022, for the corresponding Chinese application No. 201980080749.2, with English translation.
Office Action for the corresponding Japanese Application No. 2022-042153, mailed Mar. 28, 2023, with its English machine translation.
Office Action dated Jun. 12, 2023 for the corresponding Korean Application No. 10-2023-7015630 with its English machine translation.
JPO, Japanese Office Action mailed Jul. 2, 2024 for the related Japanese application No. 2023-098188, with English Machine translation, 7 pages.

* cited by examiner

VALVE DEVICE

CROSS REFERENCE TO RELATED APPLICATIONS

This application is a continuation application of U.S. patent application Ser. No. 17/299,593 filed on Dec. 7, 2021, which was a 371 national phase application of PCT International Application No. PCT/JP2019/046649 filed Nov. 28, 2019, which claims the benefit of Japanese Patent Application No. 2018-228363, filed Dec. 5, 2018, the entire disclosure of each of which is incorporated herein by reference.

FIELD OF INVENTION

The present invention relates to a valve device including a bent channel.

BACKGROUND

A valve device includes a block-shaped valve body, for example, made of aluminum alloy, and performs switching of channels by causing a valve body arranged inside the valve main body to contact with or separate from a valve seat. In other words, inside the valve main body, the channel in which fluid flows is formed. This channel is formed by cutting the block-shaped valve main body.

PRIOR ART DOCUMENT

Patent Document

Patent Document 1: Japanese Patent Laid-Open No. 2011-89732

SUMMARY OF INVENTION

Problems to be Solved by Invention

In cutting, the block-shaped valve main body is linearly cut by a drill or the like. Therefore, when forming a plurality of channels, it is necessary to perform cutting from different positions of the valve main body as bases, and cause the channels to meet one another inside the valve main body.

Since the valve main body is linearly cut, a place where the channels meet one another becomes a bent channel. Therefore, there is a possibility that pressure to push out the fluid is lost.

The present invention has been made to solve the above problem, and an object of the present invention is to provide a valve device capable of reducing pressure loss.

Means to Solve the Problem

In order to solve the above problem, a valve device of the present invention includes:
  a valve main body having a valve chamber in which a valve body is arranged, an inflow outlet, and a communication hole communicating the valve chamber and the inflow outlet; and
  a rectification member arranged in the communication hole,
  in which
  the communication hole has a bent portion in which a center line of the communication hole is bent, and
  the rectification member is arranged in the bent portion and has a corner portion formed by an inner circumferential surface bent or curved at an angle larger than an angle of the bent portion.

The bent portion may be bent at an angle of 90 degrees. At least two bent portions may be provided, the two bent portions may be continuously arranged, and the rectification member may be arranged across the two bent portions. The valve main body may have a recess, the rectification member may have a fitting portion, and the valve device may further include a whirl-stop member fit to the fitting portion and inserted into the recess.

A pipe provided outside the valve main body and having a curved shape may be further included, and the pipe may communicate with the communication hole. A fitting attaching portion separate from the valve main body may be further included, the pipe may be connected with the fitting attaching portion on a side opposite to an end portion connected with the valve main body, and the fitting attaching portion may be fixed to the valve main body.

The pipe may be connected with each of the valve main body and the fitting attaching portion by brazing. A material of the pipe and a material of the valve main body may be the same.

Effect of Invention

According to the present invention, it is possible to obtain a valve device capable of reducing pressure loss.

EMBODIMENTS

First Embodiment

Figure 1:
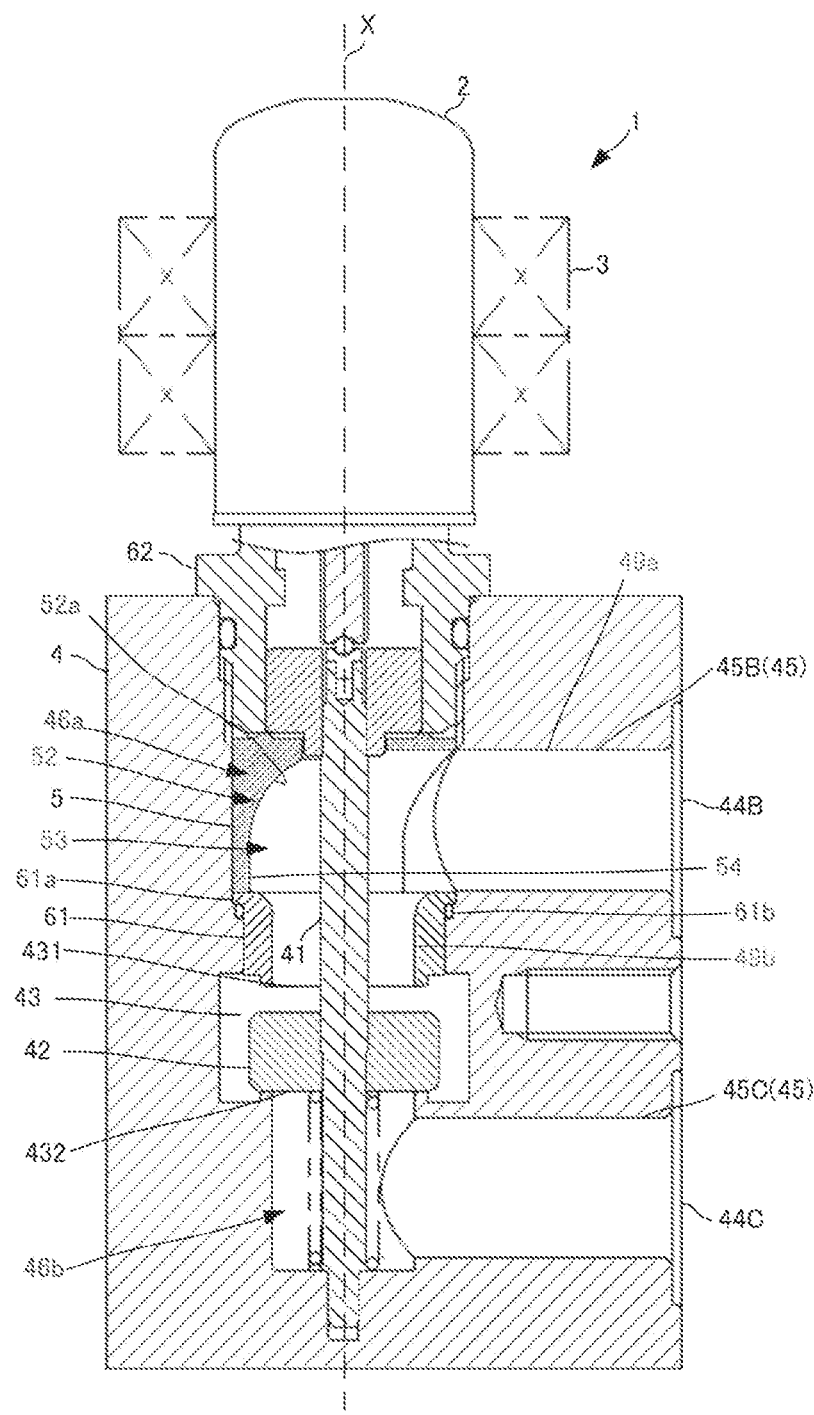
FIG. 1 is a front cross-sectional view of a valve device according to a first embodiment.
Figure 2:
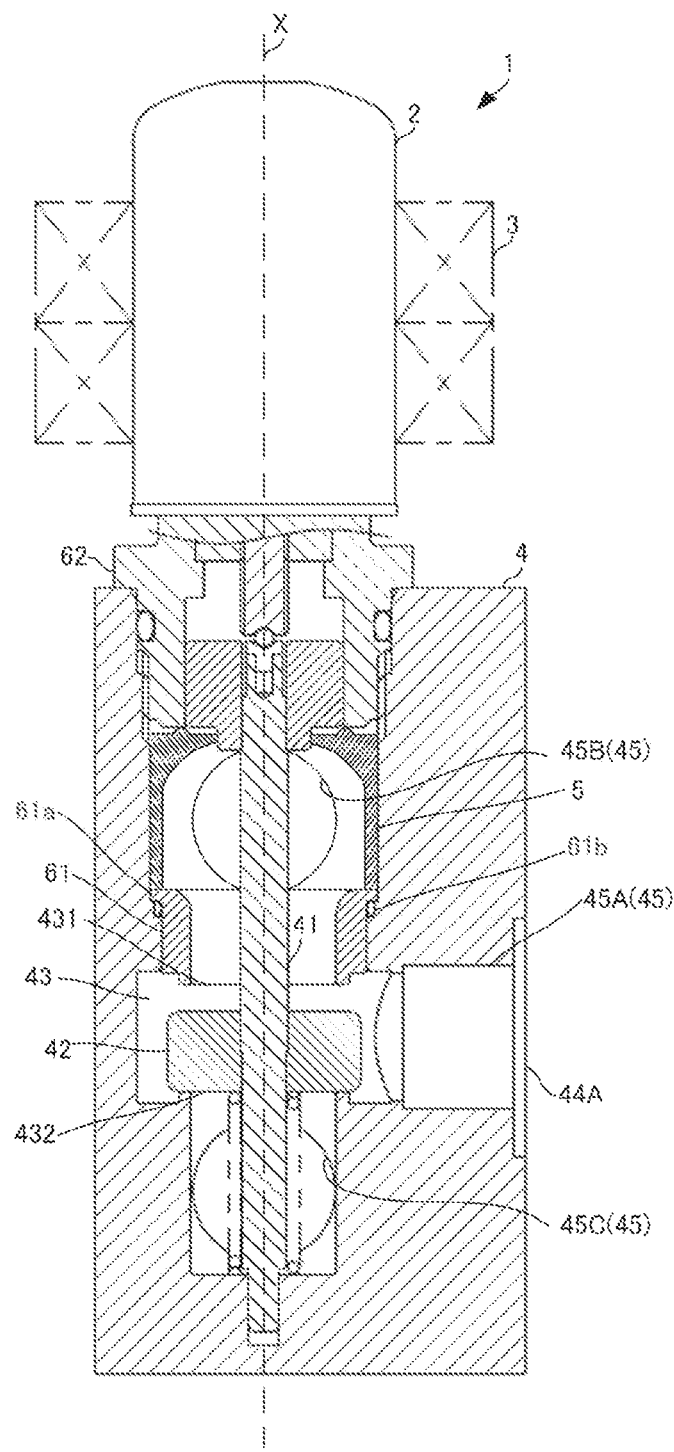
FIG. 2 is a side cross-sectional view of the valve device according to the first embodiment.

A valve device according to a first embodiment will be described with reference to figures. FIG. 1 is a front cross-sectional view of the valve device according to the first embodiment. FIG. 2 is a side cross-sectional view of the valve device according to the first embodiment. Note that a description of a vertical direction in the present specification refers to a vertical direction in the figures and does not refer to a direction when the valve device is actually arranged. As shown in FIGS. 1 and 2, a valve device 1 includes a can 2, a stator member 3, and a valve main body 4.

The can 2 has a cylindrical shape with bottom, that is, a cup shape with one end hemispherically closed. The can 2 is a container that accommodates a drive mechanism to move a valve shaft 41 described later in a direction of an X axis. Inside the can 2, a rotor member is accommodated. The can 2 is fastened by welding to a screw 62 as a holder that fixes the drive mechanism. On the screw 62, a male thread portion is formed on the underside of a part fastened to the can 2, and a sealing member for sealing is arranged between the fastened part and the male thread. On the inner side of an opening on the top surface of the valve main body 4, a female thread to be screwed with the male thread of the screw 62 is formed. By screwing the screw 62 into the opening on the top surface of the valve main body 4, the screw 62 is fixed to the valve main body.

The stator member 3 is fitted to an outer circumference of the can 2. The stator member 3 has a coil. This coil receives power supply via a lead wire. The stator member 3 forms a stepping motor together with the rotor member accommodated inside the can 2. This stepping motor is a drive source to move the valve shaft 41.

The valve main body 4 is block-shaped made of material such as aluminum alloy. The valve main body 4 has the valve shaft 41, a valve body 42, a valve chamber 43, an inlet 44A, a first outlet 44B, a second outlet 44C, communication holes 45A, 45B, and 45C, and a rectification member 5. Note that the communication holes 45A, 45B, and 45C will be referred to as communication holes 45 when they are not distinguished.

The valve shaft 41 has a rod shape. The valve shaft 41 is arranged such that an axis thereof coincides with the central axis X of the can 2. The valve shaft 41 is arranged in an internal space inside the valve main body 4 and is movable in the direction of the axis X. One end portion of the valve shaft 41 is connected with the drive mechanism accommodated inside the can 2. The valve shaft 41 moves the valve body 42 in the direction of the axis X.

In the internal space inside the valve main body 4, the valve chamber 43 connected with the communication hole 45A is provided. The valve chamber 43 is a space in which the valve body 42 is arranged. The valve chamber 43 has a first valve seat 431 and a second valve seat 432. The first valve seat 431 is arranged on the upper end surface of the valve chamber 43 in the direction of the axis X (the top surface on the can 2-side), and the second valve seat 432 is arranged on the lower end surface of the valve chamber 43 in the direction of axis X. The communication hole 45B is connected with the upper side of the first valve seat 431 in the direction of the axis X (the can 2 side) via a linear portion 49b, and the communication hole 45C is connected with the underside of the second valve seat 432 in the direction of the axis X via a bent portion 46b. Therefore, the valve chamber 43 communicates with the communication holes 45B and 45C.

The valve body 42 is press-fitted to and is fixed to the outer circumference of the valve shaft 41. That is, the valve body 42 moves upward or downward in the direction of the axis X together with the valve shaft 41. By moving upward or downward in the direction of the axis X, the valve body 42 contact with or separate from the first valve seat 431 or the second valve seat 432. When the valve body 42 is seated on the first valve seat 431, the communication hole 45B is blocked, and fluid flows into the communication hole 45C. On the other hand, when the valve body 42 is seated on the second valve seat 432, the communication hole 45C is blocked, and the fluid flows into the communication hole 45B.

The inlet 44A is provided on a side surface of the valve main body 4. The inlet 44A is an opening through which the fluid flows into the valve main body 4. One end portion of the communication hole 45A is the inlet 44A, and the other end portion is connected with the valve chamber 43. The valve chamber 43 and the inlet 44A communicate with each other via the communication hole 45A. That is, the fluid that has flowed in from the inlet 44A passes through the communication hole 45A and flows into the valve chamber 43.

The first outlet 44B and the second outlet 44C are openings through which the fluid flows out. The first outlet 44B and the second outlet 44C are provided on a side surface of the valve main body 4 side by side in the direction of the axis X with the opening axes being in a direction perpendicular to the axis X. One end portion of the communication hole 45B is the first outlet 44B. A part of the communication hole 45B connected with the first outlet 44B (a linear portion 49a) extends from the first outlet 44B toward the valve shaft 41 in a direction orthogonal to the direction of the axis X. The other end portion of the communication hole 45B is the valve seat 431. A part of the communication hole 45B connected with the valve chamber 43 (the linear portion 49b) is arranged such that the center line thereof coincides with the axis X. At a part where the linear portions 49a and 49b intersect with each other, a bent portion 46a is formed. That is, the communication hole 45B has the linear portions 49a and 49b that linearly extend, and the two linear portions 49a and 49b are connected with each other at the bent portion 46a formed inside the valve main body 4. As described later, the rectification member 5 is arranged in the bent portion 46a, and a passage 53 through which a coolant flows is formed inside the rectification member 5. On the valve chamber 43-side of the rectification member 5, a tubular cylindrical sheet 61 forming the linear portion 49b is arranged.

One end portion of the communication hole 45C is the second outlet 44C. A part of the communication hole 45C which is the second outlet 44C extends from the second outlet 44C toward the valve shaft 41 in a direction orthogonal to the direction of the axis X. The other end portion of the communication hole 45C is the valve seat 432. A part of the communication hole 45C at the valve chamber 43-side is configured such that the center line thereof coincides with the axis X. At a part where linear portions of the communication hole 45C on both sides intersect with each other, the bent portion 46b is formed. That is, the second outlet 44C and the valve chamber 43 communicate with each other via the communication hole 45C.

The rectification member 5 is a member arranged at a part where the flow direction of the linear part changes. In the present embodiment, the rectification member 5 is arranged in the bent portion 46a of the communication hole 45B and has the passage 53 that connects the linear portions 49a and 49b with each other. For the material of the rectification member 5, metal or resin can be used. In the present embodiment, polyphenylene sulfide resin (PPS) is used as the material of the rectification member 5. By using PPS as the material of the rectification member 5, machining is facilitated, and productivity is improved. Moreover, the weight of the valve device 1 can be reduced.

The rectification member 5 is arranged between the cylindrical sheet 61 and the screw 62. The cylindrical sheet 61 is inserted from the opening on the top surface of the valve main body 4 which is the end surface fastened to the can 2, and then the rectification member 5 is inserted thereto, and lastly, the screw 62 is fastened to the opening on the top surface of the valve main body 4. By being sandwiched between the screw 62 and the cylindrical sheet 61, the rectification member 5 is fixed inside the bent portion 46a. That is, the rectification member 5 functions as a retainer for the cylindrical sheet 61, and the screw 62 functions as a retainer for the rectification member 5.

The cylindrical sheet 61 is substantially cylindrical member, in which the valve seat 431 is formed on the lower end portion and a flange portion 61a is formed on the upper end portion. The lower surface of the flange portion 61a abuts and is stopped by the valve main body 4 via a seal member 61b, and the top surface of the flange portion 61a abuts the rectification member 5. The sealing member 61b such as an O-ring prevents the fluid that does not pass through the first valve seat 431 from flowing to the first outlet 44B-side. Inside the cylindrical sheet 61, the linear portion 49b that couples the passage 53 of the rectification member 5 and the valve chamber 43 with each other is formed. Note that the first valve seat 431 may be formed on the valve main body 4 by cutting without using the cylindrical sheet 61.

Figure 3A:
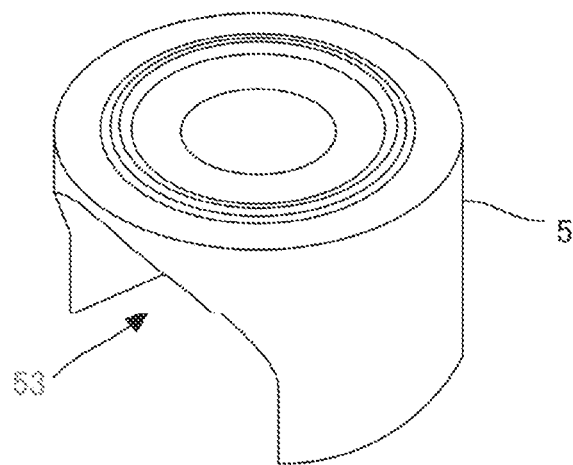
FIG. 3A is a perspective view of a rectification member according to the first embodiment.
Figure 3B:
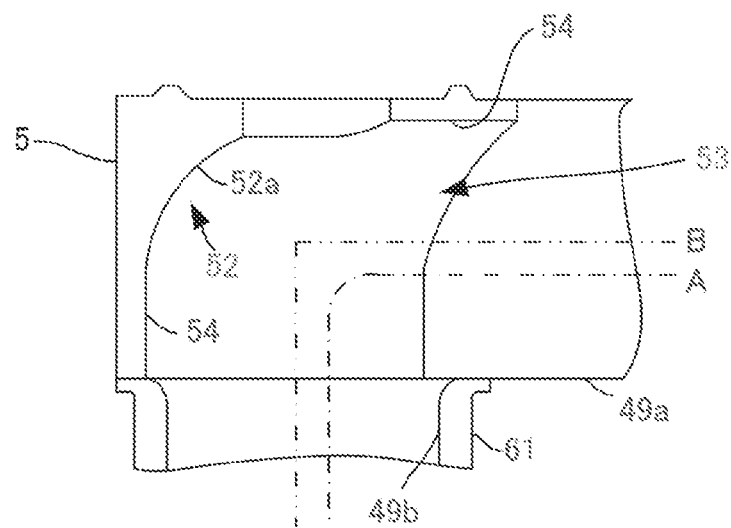
FIG. 3B is a cross-sectional view of the rectification member according to the first embodiment.

FIG. 3A shows a perspective view of the rectification member 5, and FIG. 3B shows a cross-sectional view of the rectification member 5. As shown in FIG. 3A, the rectification member 5 has a cylindrical shape from which a part corresponding to the linear portion 49a is cut off. The rectification member 5 is arranged in the bent portion 46a such that the central axis thereof coincides with the axis X. The passage 53 through which the fluid flows is formed along the inner circumferential surface of the rectification member 5. A channel through which the fluid flows is formed by the linear portions 49a and 49b of the communication hole 45B and the passage 53 of the rectification member 5. As shown in FIG. 3B, the rectification member 5 has a corner portion 52 formed by an inner circumferential surface bent or curved at an angle larger than the angle of the bent portion 46, and non-curved portions 54 formed by linear inner circumferential surfaces (inner circumferential surfaces that are not curved). That is, the outer circumferential surface of the passage 53 of the rectification member is formed by the corner portion 52 and the non-curved portions 54. The angle of the bent portion stated herein refers to an angle formed by the center lines of the communication holes forming the bent portion. For example, since the angle of the bent portion 46a of the communication hole 45B is an angle formed by the center line of the linear portion 49b extending in parallel with the direction of the axis X and the center line of the linear portion 49a extending orthogonally to the direction of the axis X, the angle is a right angle (90 degrees). Note that, although the rectification member 5 of the present embodiment has the non-curved portions 54 on both sides of the corner portion 52 (both sides of the flow direction), the non-curved portion 54 may be formed on either the upstream side or the downstream side, or the dimensions of the corner portion 52 and the passage 53 may be set so that the non-curved portion 54 is not formed on both side.

As shown in FIG. 1, an inner circumferential surface 52a of the corner portion 52 is curved or bent at an angle larger than an angle formed by a wall surface of an inner circumferential surface of the bent portion 46a. The inner circumferential surface of the corner portion being curved or bent at an angle larger than the inner circumferential surface of the bent portion means that, the radius of curvature of the inner circumferential face of the corner portion of the rectification member 5 is larger than that of the inner circumferential face forming a corner of two faces along the flow direction in internal space of the bent portion in a shape of a section along the central axis of the channel (the section shown in FIG. 1). Further, the inner circumferential surface of the rectification member 5 being bent at an angle larger than the angle of the inner circumferential face of the bent portion means that the radius of curvature of the central line of the corner portion of the rectification member 5 is larger than a bending angle of the bent portion.

In the present embodiment, as shown in FIG. 3B, the center line of the passage 53 of the rectification member 5 (reference sign A in FIG. 3B is configured such that the radius of curvature is larger than that of the center line of the flow direction in the internal space (reference sign B in FIG. 3B at a position where the flow direction of the channel changes. That is, in the present embodiment, shapes of sections of the inner circumferential surface 52a of the corner portion 52 of the rectification member 5 along the axis X and the center line of the linear portion 49a are gently rounded-shapes without a corner. Note that, in the present embodiment, an angle at which the center line of the bent portion 46a in the flow direction in the internal space (reference sign B in FIG. 3B bends is 90 degrees, which is the same as the angle formed by the center lines of the linear portions 49b and 49a. Further, the inner circumferential surface 52a of the corner portion 52 is in a smooth shape having no irregularities. Having no irregularities means that there are no steps.

Note that, although the rectification member 5 is provided only in the bent portion 46a of the communication hole 45B in the present embodiment, the rectification member 5 may be provided in the bent portion 46b of the communication hole 45C. That is, the rectification member 5 may be provided only in a part of the bent portions that the communication holes 45 have (46a or 46b) or may be provided in all the bent portions (46a and 46b).

Next, actions will be described. When the valve body 42 is seated on the second valve seat 432, the fluid that has flowed into the valve chamber 43 from the communication hole 45A flows into the communication hole 45B.

In the present embodiment, the rectification member 5 having the passage 53 in which the fluid flows is provided, and the rectification member 5 is arranged in the bent portion 46a of the communication hole 45B. That is, the fluid flows not through the bent portion 46 of the communication hole 45B but through the passage 53 of the rectification member 5. The passage 53 of the rectification member 5 has the inner circumferential surface 52a (the inner circumferential surface 52a of the corner portion 52) having the radius of curvature larger than the corner of the wall surface of the bent portion 46a. Therefore, the fluid can flow more smoothly than when passing through the bent portion 46a that does not have the rectification member 5, and pressure loss can be reduced.

If the wall surface of a passage (a channel) of coolant has irregularities, that is, steps, there is a possibility that the fluid swirls due to the steps, which may lead to pressure loss. In the present embodiment, the passage 53 of the rectification member 5 is in a smooth shape without irregularities. Therefore, it is possible to prevent the fluid flowing through the passage 53 of the rectification member 5 from swirling, and it is possible to reduce pressure loss.

(Effects)

The valve device 1 of the present invention is provided with the valve main body 4 having the valve chamber 43 in which the valve body 42 is arranged, the inflow outlet 44, and the communication hole 45 communicating the valve chamber 43 and the inflow outlet 44, and the rectification member 5 arranged in the communication hole 45. The communication hole 45 has the bent portion 46a in which the center line of the communication hole 45 is bent, and the rectification member 5 is arranged in the bent portion 46a and has the corner 52 formed by an inner circumferential surface 52a bent or curved at an angle larger than an angle of the bent portion 46a.

By this, the fluid flows not through the bent portion 46a that the communication hole 45 has but through the passage 53 of the rectification member 5. Since the passage 53 of the rectification member 5 is in a smooth shape without irregularities, the fluid smoothly flows in the passage 53 of the rectification member 5. Therefore, it is possible to reduce pressure loss.

Especially, the bent portion 46a of communication hole 45 is bent at a right angle (the bending angle is 90 degrees). Even in such a case, since the corner portion 52 of the rectification member 5 in the present embodiment has a radius of curvature larger than that of the corner portion of the bent portion 46, the fluid can smoothly flow in comparison with the case of flowing in the bent portion 46a. Therefore, it is possible to reduce pressure loss.

Second Embodiment

Figure 4:
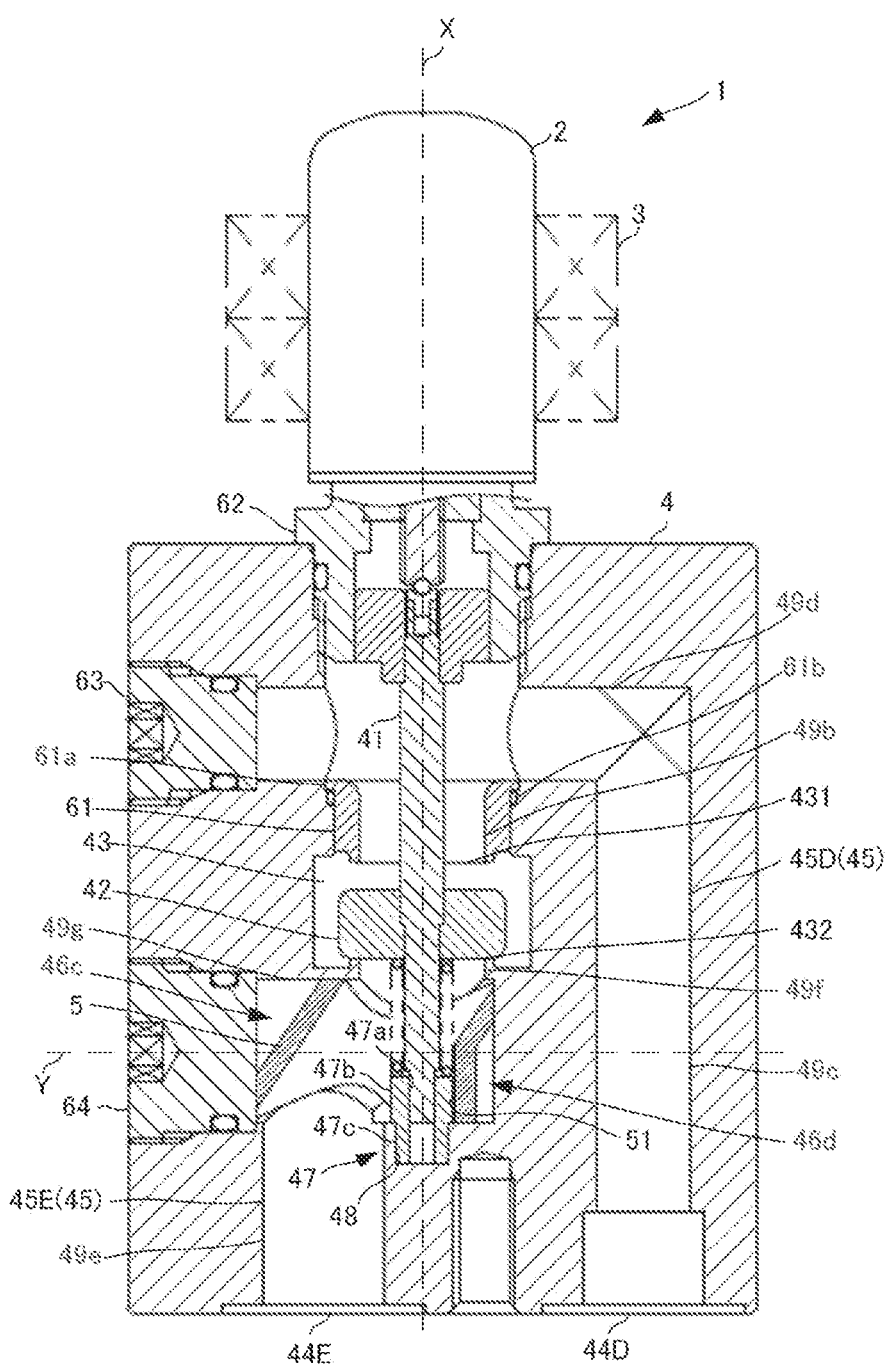
FIG. 4 is a front cross-sectional view of a valve device according to a second embodiment.

A valve device according to a second embodiment will be described with reference to figures. Note that, as for the same components and functions as the first embodiment, the same reference signs will be given, and detailed description thereof will be omitted. FIG. 4 shows a front cross-sectional view of the valve device according to the second embodiment. As shown in FIG. 4, the valve device according to the second embodiment is different from the first embodiment in the shapes of the communication holes 45B and 45C. The shape of the communication hole 45A is similar to that of the first embodiment.

First and second outlets 44D and 44E are arranged on an end surface opposite to the end surface where the valve main body 4 is fastened to the can 2. The first and second outlets 44D and 44E are arranged to sandwich the axis X.

A communication hole 45D has linear portions 49c and 49d. The linear portion 49c extends in parallel with the direction of the axis X from the first outlet 44D and does not reach the end surface of the valve main body 4 on the opposite side of the first outlet 44D. The linear portion 49d linearly extends in a direction orthogonal to the axis X. One end portion of the linear portion 49d is connected with an end portion of the linear portion 49c. Note that the other end portion of the linear portion 49d is an opening on the valve main body 4, and this opening is sealed by a plug 63 as described later. Further, the linear portion 49d is connected with the linear portion 49b formed inside the cylindrical sheet 61. Thus, the first outlet 44D communicates with the valve chamber 43 via the linear portions 49c, 49d and 49b.

A communication hole 45E has linear portions 49e, 49f and 49g. The linear portion 49e extends in parallel with the direction of the axis X from the second outlet 44E. The linear portion 49f is arranged such that the central axis thereof coincides with the central axis X. One end portion of the linear portion 49f is connected with the valve chamber 43. The linear portion 49g extends in the direction orthogonal to the axis X and intersects with the linear portions 49e and 49f. At a part where the linear portions 49a and 49b intersect with each other, a bent portion 46c is formed. Further, at a part where the linear portions 49a and 49b intersect with each other, a bent portion 46d is formed. That is, the communication hole 45E is formed with the two bent portions 46c and 46d.

The bent portions 46c and 46d are continuously provided at positions nearby. The positions nearby refers to, for example, a range of twice the diameter of the communication hole 45C or less. The communication hole 45C has a substantially crank shape due to the two bent portions 46. The crank shape refers to a shape obtained by reversing one of two L-shapes so that the L-shapes are point symmetric and connecting the end portions of short sides of the L-shapes.

Note that two plugs 63 and 64 are provided on a side surface of the valve main body 4. The plug 63 is a member for blocking an opening made when cutting the valve main body 4 to form the linear portion 49d, and the plug 64 is a member for blocking an opening made when forming the linear portion 49g. The plugs 63 and 64 are inserted into the openings, respectively. Therefore, the openings are blocked by the plugs 63 and 64 to prevent the fluid from flowing out of the openings.

The rectification member 5 is provided in the two bent portions 46c and 46d formed in the communication hole 45E. Provided in the two bent portions 46 means that the rectification member 5 is arranged such that the fluid does not flow into the two bent portions 46.

Figure 5:
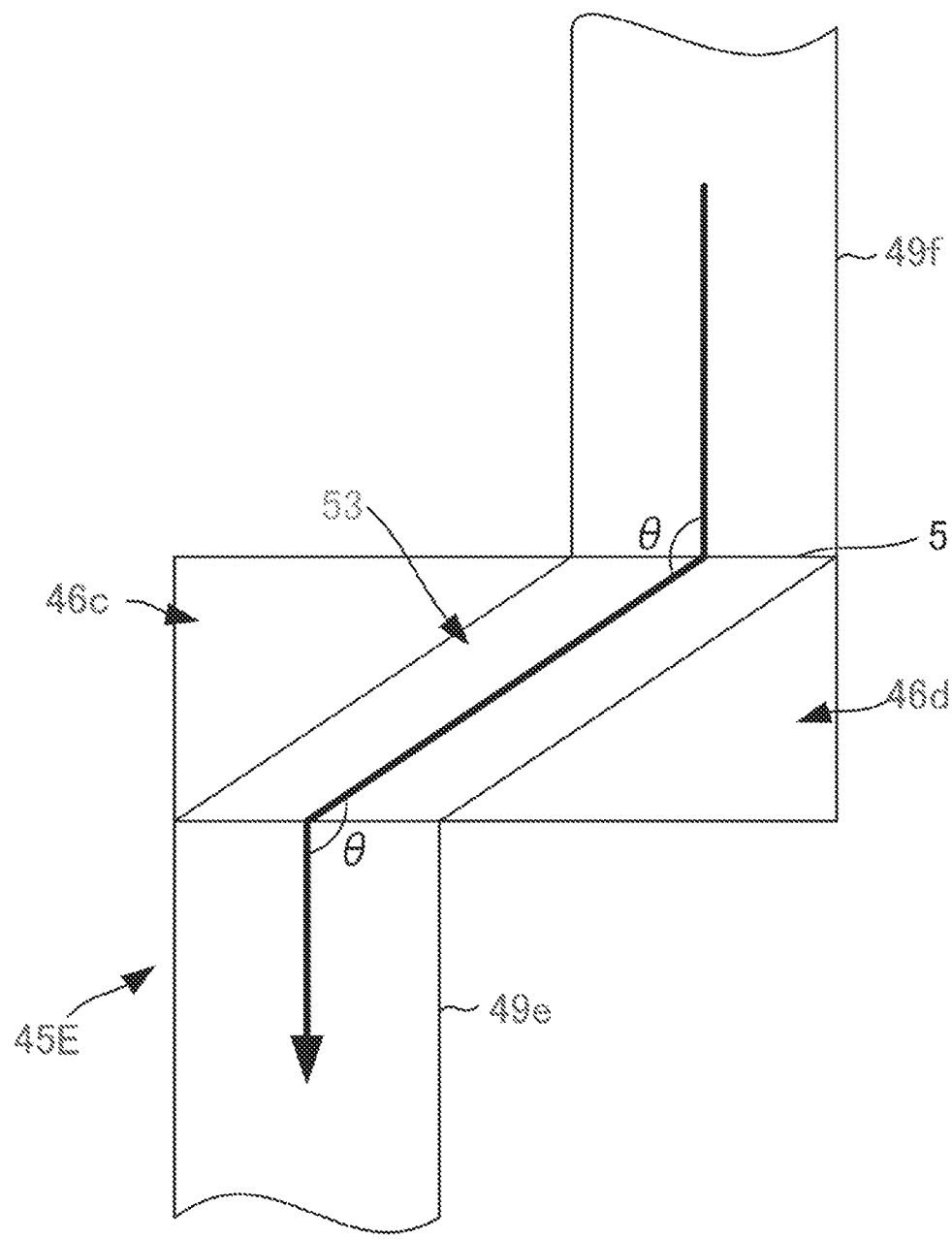
FIG. 5 is a schematic diagram of fluid flowing along an inner circumference of the rectification member.

FIG. 5 shows a schematic diagram of the fluid flowing in the rectification member of the second embodiment. As shown in FIG. 5, in the rectification member 5, the passage 53 that is cut obliquely relative to the axis X is formed to connect the linear portions 49f and 49e that are vertically positioned in the direction of the axis X. Therefore, the fluid flows as shown by an arrow in FIG. 5. That is, the fluid that has flowed through the linear portion 49f flows not in the bent portions 46c and 46d that are bent at right angles in a crank shape, but in the passage 53 of the rectification member 5. Then, the fluid is bent at an angle larger than a right angle by the passage 53 cut obliquely relative to the axis X. In the present embodiment, the passage 53 is formed such that an angle θ shown in FIG. 5 is approximately 135 degrees.

Specifically, when the fluid that has flowed through the linear portion 49f from the valve chamber 43 flows into the passage 53 of the rectification member 5, the fluid bends at an angle larger than the bent portion 46d, that is, at approximately 135 degrees and flows into the passage 53. Then, when the fluid that has flowed through the passage 53 of the rectification member 5 flows out from inside of the passage 53, the fluid bends at an angle larger than the bent portion 46c, that is, at approximately 135 degrees and flows into the linear portion 49e. Thus, the fluid is bent at angles larger than the angles of the two bent portions 46c and 46e, respectively, by the rectification member 5.

Figure 6A:
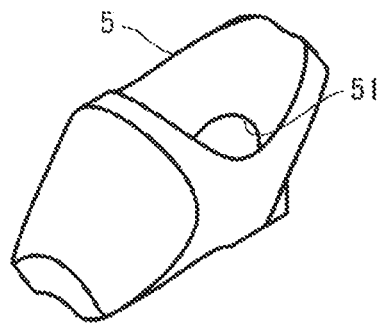
FIG. 6A is a perspective view of the rectification member.
Figure 6B:
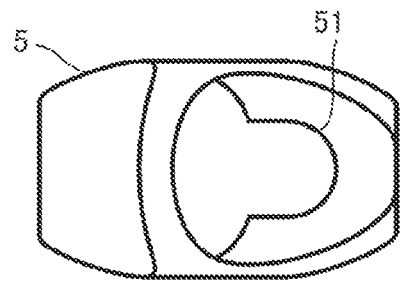
FIG. 6B is a plan view of the rectification member.
Figure 6C:
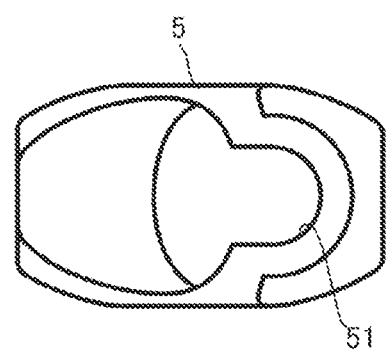
FIG. 6C is a bottom view of the rectification member.
Figure 6D:
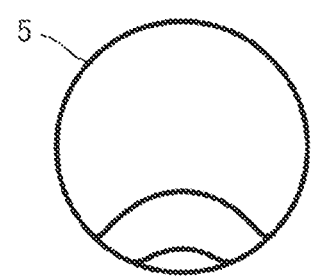
FIG. 6D is a right side view of the rectification member.
Figure 6E:
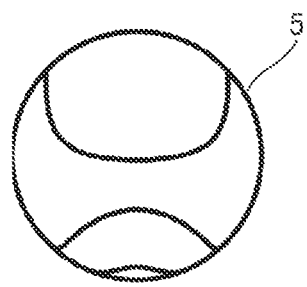
FIG. 6E is a left side view of the rectification member.

FIG. 6A is a perspective view of the rectification member, FIG. 6B is a plan view of the rectification member (a diagram seen from above), FIG. 6C is a bottom view of the rectification member, FIG. 6D is a left side view of the rectification member (a diagram seen from the plug 64-side in the direction of an axis Y, the plug 64 being shown in FIG. 4), and FIG. 6E is a right side view of the rectification member. The rectification member 5 is structured separately from the valve main body 4. As shown in FIGS. 6D and 6E, the rectification member 5 has a circular shape when seen from the direction of the axis Y. The rectification member 5 has a fitting portion 51 into which a whirl-stop member 47 described later is to be fitted.

Figure 7A:
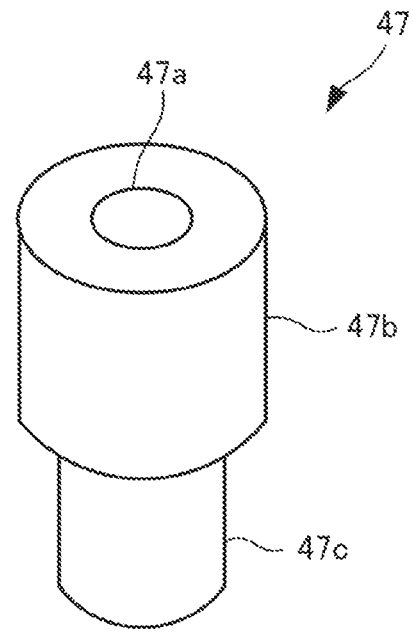
FIG. 7A is perspective view a whirl-stop member.
Figure 7B:
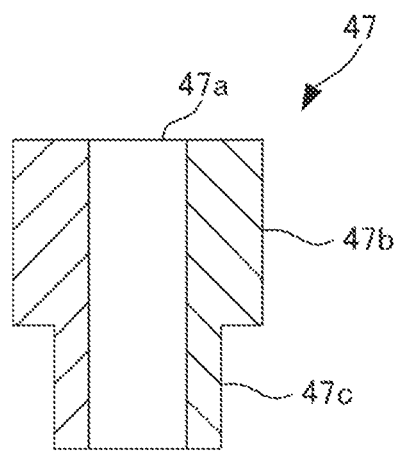
FIG. 7B is a cross-sectional view of the whirl-stop member.

FIG. 7A is a perspective view of the whirl-stop member 47, and FIG. 7B is a sectional view of the whirl-stop member 47. The whirl-stop member 47 is a member that fixes the rectification member 5 to prevent the rectification member 5 from rotating (rotation with the axis Y as an axis). The whirl-stop member 47 has a substantially cylindrical shape. More specifically, the whirl-stop member 47 has a guide hole 47a, a large diameter portion 47b, and a small diameter portion 47c. The valve shaft 41 is slidably inserted into the guide hole 47a. The outer diameter of the large diameter portion 47b is larger than that of the small diameter portion 47c and is fitted into the fitting portion 51. The small diameter portion 47c is inserted into a recess 48 that the valve main body 4 has.

At the time of assembling the rectification member 5 to the bent portions 46c and 46d, the rectification member 5 is inserted from the opening (the opening blocked by the plug 64) on the side surface of the valve main body 4 toward the bent portions 46c and 46d. After the insertion of the rectification member 5, the whirl-stop member 47 fits the large diameter portion 47b into the fitting portion 51 of the rectification member 5 and press-fits the small diameter portion 47c into the recess 48 of the valve main body 4. Thereby, the rectification member 5 is fixed so as not to rotate (rotation with the axis Y as the axis).

Further, in the guide hole 47a formed in the whirl-stop member 47, the lower side of the valve shaft 41 is slidably inserted. That is, the valve shaft 41 is guided by the inner circumferential face of the guide hole 47a of the whirl-stop member 47 and vertically moves. Furthermore, in the present embodiment, the plug 64 blocks the opening in a state being pressed against the rectification member 5. That is, the rectification member 5 is also fixed by the plug 64. Therefore, the rectification member 5 is more firmly fixed so as not to vibrate in the direction of the axis X or the direction of the axis Y. However, a structure in which the rectification member 5 is fixed only by the whirl-stop member 47 without the plug 64 being pressed against the rectification member 5 may be adopted.

As described above, in the valve device 1 of the present embodiment, the communication hole 45E has the two bent portions 46c and 46d, the two bent portions 46c and 46d are continuously provided at positions nearby, and the rectification member 5 is arranged in the two bent portions 46c and 46d. Thereby, it is possible to reduce pressure loss at the two bent portions 46c and 46d by the one rectification member 5, and it is possible to efficiently reduce pressure loss.

The valve main body 4 has the recess 48, the rectification member 5 has the fitting portion 51, and the valve main body 4 is further provided with the whirl-stop member 47 to be fitted into the fitting portion 51 and inserted into the recess 48. Thereby, by fitting the whirl-stop member 47 into the fitting portion 51, the rectification member 5 can be fixed so as not to rotate. Therefore, it is possible to easily fix the rectification member 5, and productivity of the valve device 1 is improved.

Although each of the two bent portions formed in the communication hole 45D are not provided with the rectification member 5 in the present embodiment, each of the bent portions of the communication hole 45D may be provided with the rectification member 5. By providing the rectification members 5, it is also possible to reduce pressure loss in the communication hole 45D.

Further, although the one rectification member 5 is provided in the two bent portions 46c and 46d of the communication hole 45E in the present embodiment, two rectification members 5 may be provided so that each of the bent portions 46c and 46d is provided with one rectification member 5.

Third Embodiment

Figure 8:
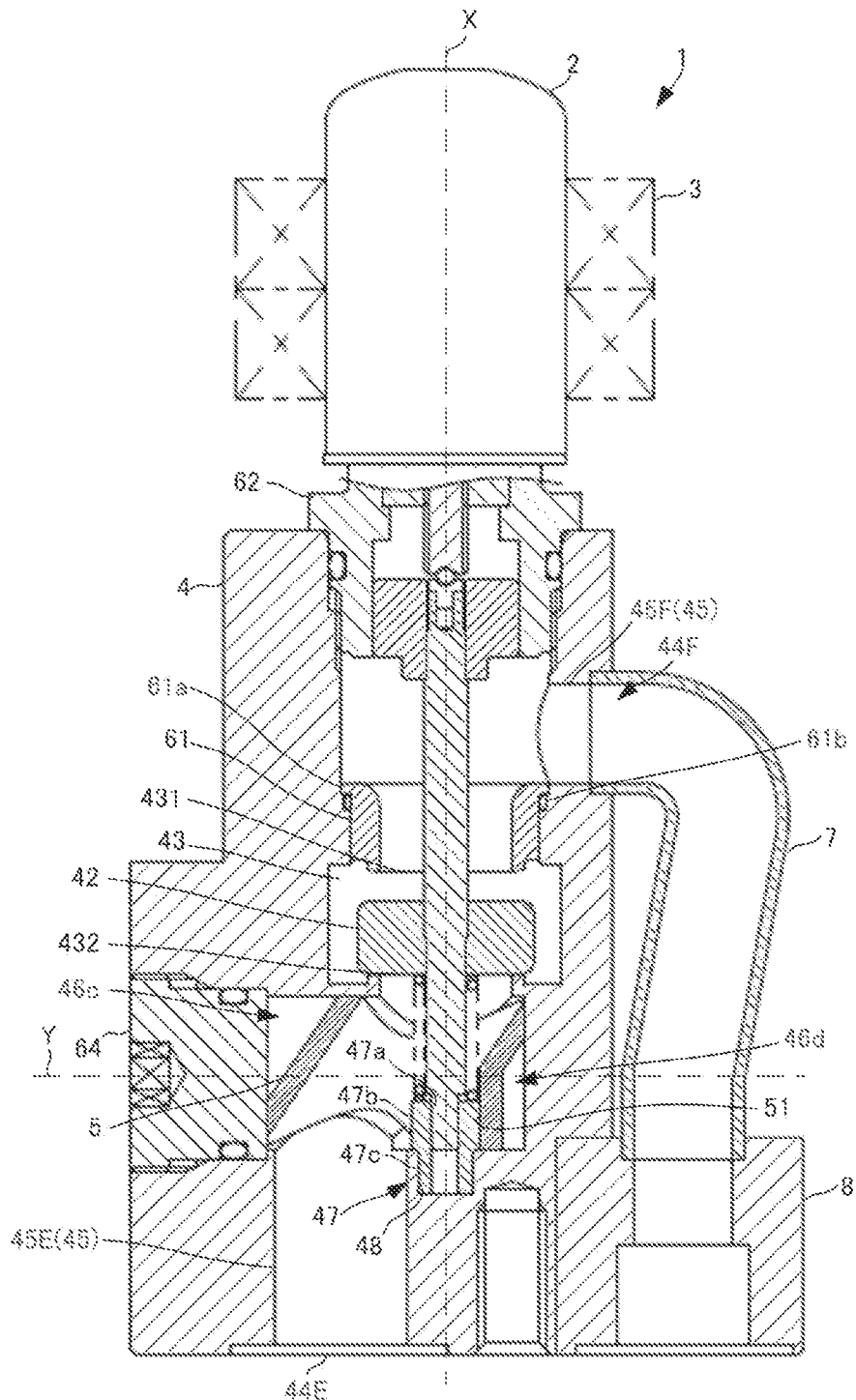
FIG. 8 is a front cross-sectional view of a valve device according to a third embodiment.

A valve device 1 according to a third embodiment will be described with reference to a drawing. FIG. 8 shows a front sectional view of the valve device according to the third embodiment. As shown in FIG. 8, the present embodiment is different from the second embodiment in that a pipe 7 and a fitting attaching portion 8 are provided.

The pipe 7 is a tube through which the fluid flows. The pipe 7 is configured of a metallic member. It is preferred that the pipe 7 is configured of the same member as that of the valve main body 4. In the present embodiment, the pipe 7 is made of aluminum alloy that is the same material as the valve main body 4. The inner circumferential surface of the pipe 7 is in a smooth shape without irregularities. The pipe 7 is provided outside the valve main body 4. One end portion of the pipe 7 is connected with the valve main body 4 by brazing. Specifically, the one end portion of the pipe 7 is connected with the valve main body 4 such that a first outlet 44F provided in the valve main body 4 and the opening of the pipe 7 overlap each other.

The pipe 7 connected with the first outlet 44F extends in the direction orthogonal to the axis X, is curved at an acute angle, and slightly obliquely extends toward the fitting attaching portion 8. That is, the pipe 7 is not bent. Thus, the pipe 7 has such a substantially L-shape that the part bent at a right angle is roundly curved. Note that, although the pipe 7 obliquely extends toward the fitting attaching portion 8 in the present embodiment, the pipe 7 may extend not obliquely but in parallel with the axis X.

The fitting attaching portion 8 is separate from the valve main body 4. The bottom surface of the fitting attaching portion 8 (an end surface on the side opposite to the side connected with the pipe 7) is arranged to be flush with the bottom surface of the valve main body 4 (an end surface on the side opposite to the side where the valve main body 4 faces the can 2). The fitting attaching portion 8 has an opening through which the fluid flows. The pipe 7 and the fitting attaching portion 8 are connected by brazing such that this opening and an opening on the other end portion of the pipe 7 overlap each other. Thus, the communication holes 45F and the fitting attaching portion 8 communicate with each other via the pipe 7. Further, the fitting attaching portion 8 is fixed to the valve main body 4 by brazing. Note that means for fixing the fitting attaching portion 8 to the valve main body 4 is not limited to the above, and for example, various method such as fixation by welding and screwing by a bolt can be used.

As described above, the valve device 1 of the present embodiment is further provided with the pipe 7 that is provided outside the valve main body 4 and has a curved shape, and the pipe 7 communicates with the communication hole 45F. Thereby, since the size of the block-shaped valve main body 4 can be reduced, it is possible to reduce the weight of the valve device 1. Further, since the pipe 7 has a curved shape, it is possible to reduce pressure loss of the fluid flowing inside the pipe 7.

Furthermore, since it is possible to reduce parts of the valve main body 4 that require cutting, by forming the channel by the pipe 7, it is possible to shorten time required for cutting of the valve main body 4. Moreover, since it is possible to perform machining work for the pipe 7 and work for connecting the pipe 7 and the fitting attaching portion 8 in parallel to the cutting work for the valve main body 4, and productivity of the valve device 1 is improved. In addition, since the number of openings formed on the valve main body 4 is reduced because the parts where the valve main body 4 is cut is reduced, the number of plugs for blocking the openings can be also reduced, and it is possible to reduce the number of parts and costs.

The pipe 7 is connected with each of the valve main body 4 and the fitting attaching portion 8 by brazing. Therefore, the pipe 7 can be connected with the valve main body 4 and the fitting attaching portion 8 by setting brazing material at desired positions and heating the brazing material. Therefore, work for connecting the pipe 7 can be simplified, and the productivity of the valve device 1 is improved.

The fitting attaching portion 8 that is separate from the valve main body 4 is further provided, the pipe 7 is connected with the fitting attaching portion 8 on the side opposite to the end portion connected with the valve main body 4, and the fitting attaching portion 8 is fixed to the valve main body 4. By the fluid flowing, vibrations occur on the valve device 1. However, by fixing the fitting attaching portion 8 to the valve main body 4, the vibration that occur on the pipe 7 can be reduced. Therefore, it is possible to prevent a joined position between the pipe 7 and each of the valve main body 4 and the fitting attaching portion 8 from deteriorating due to the vibrations, and the durability of the valve device 1 is improved.

The material of the pipe 7 and the material of the valve main body 4 are the same. By using the same materials for the pipe 7 and the valve main body 4, it is possible to prevent corrosion due to potential difference between the members, and it is possible to obtain the valve device 1 the durability of which is improved.

Note that, although the pipe 7 is joined with the valve main body 4 and the fitting attaching portion 8 by brazing in the present embodiment, the joining is not limited thereto, and the joining may be by a sealing member. Further, although the pipe 7 has a substantially L-shape, the shape of the pipe 7 is only required to be a curved shape, and for example, an S-shape and the like are also possible.

Other Embodiments

Although the embodiments according to the present invention have been described in the present specification, these embodiments are presented as examples and are not intended to limit the scope of the invention. The embodiments as described above can be practiced in other various forms, and it is possible to make various omissions, replacements, and changes within a range not departing from the scope of the invention. Embodiments and modifications thereof are included not only in the scope and spirit of the invention but also in an invention described in Claims and the scope equal to the invention.

Although the three-way valve device 1 is used in the present embodiment, the valve device 1 is not limited thereto. A two-way valve, a four-way valve, or a more-way valve may be used as long as the communication holes 45 are bent.

Although the rectification member 5 is fixed by the cylindrical sheet 61 and the screw 62 in the first embodiment, the rectification member 5 may be fixed in the form being fitted in the whirl-stop member 47 as in the second embodiment. Further, although the whirl-stop member 47 is separate from the valve main body 4 in the present embodiments, the whirl-stop member 47 is not limited thereto. The whirl-stop member 47 may be formed by cutting the valve main body 4 so as to be integrated with the valve main body 4. In this case, the rectification member 5 may be inserted from the opening blocked by the plug 64, the fitting portion 51 of the rectification member 5 may be fitted into the large diameter portion 47b of the whirl-stop member 47, an then, the valve shaft 41 may be inserted into the guide hole 47a.

Figure 9:
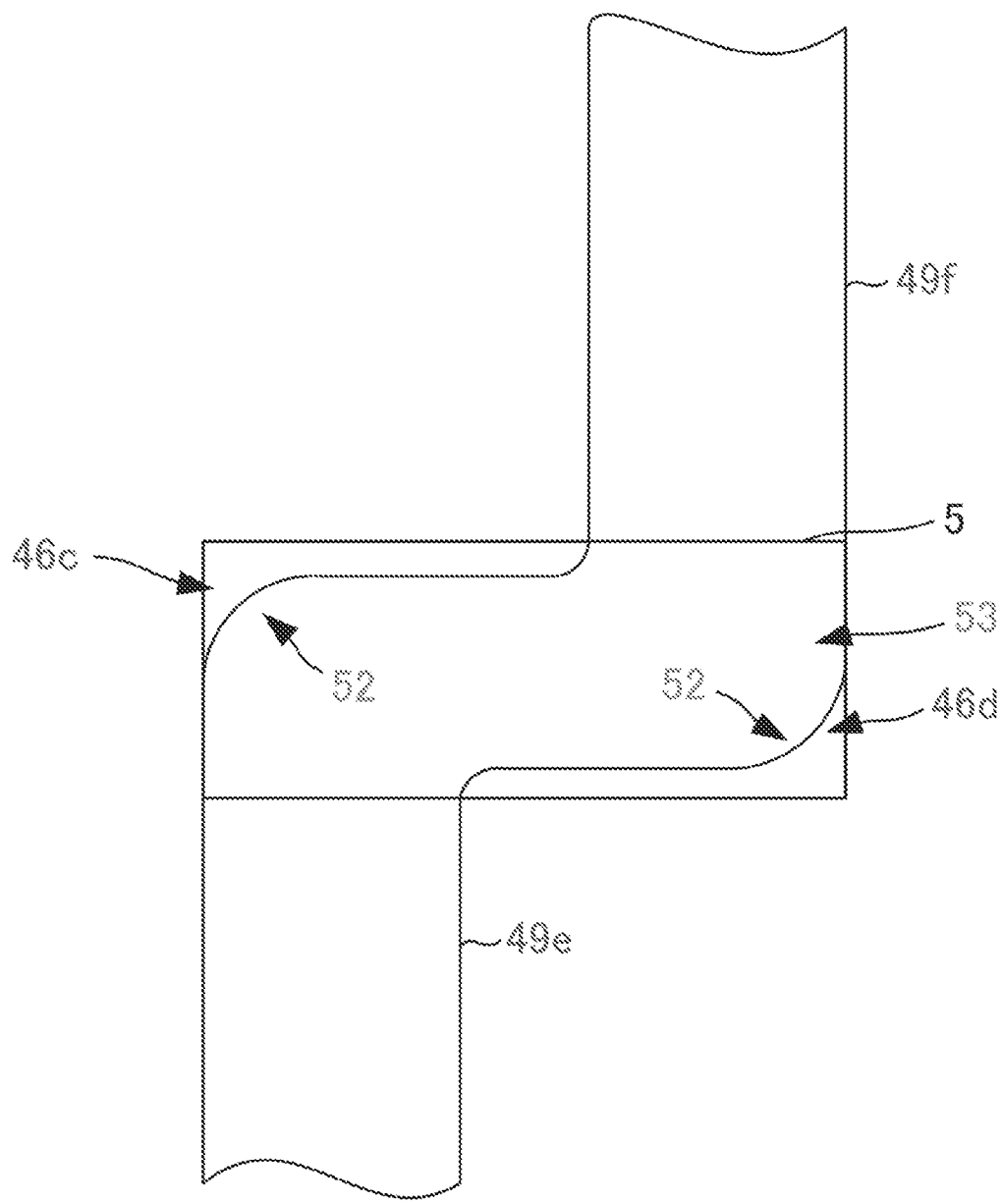
FIG. 9 is a cross-sectional view of an inner circumferential shape of a rectification member of another embodiment.

Although the passage 53 of the rectification member 5 is in a bent shape that is cut obliquely relative to the axis X in the second embodiment, the passage 53 may have the corner portions 52 for each of the two bent portions 46, and each corner portion 52 may be in a curved shape as shown in FIG. 9.

REFERENCE SIGNS LIST

1 Valve device
2 Can
3 Stator member
4 Valve main body
41 Valve shaft
42 Valve body
43 Valve chamber
431 First valve seat
432 Second valve seat
44A Inlet
44B, 44D, 44F First outlet
44C, 44E Second outlet
45A, 45B, 45C, 45D, 45E, 45F Communication hole
46, 46a, 46b, 46c, 46d Bent portion
47 Whirl-stop member
47a Guide hole
47b Large diameter portion
47c Small diameter portion
48 Recess
49a, 49b, 49c, 49d, 49e, 49f, 49g Linear portion
5 Rectification member
51 Fitting portion
52 Corner portion
52a Inner circumferential face
53 Passage
54 Non-curved portion
61 Cylindrical sheet
61a Flange portion
61b Seal member
62 Screw
63, 64 Plug
7 Pipe
8 Fitting attaching portion

The invention claimed is:

1. A valve device comprising:
a valve main body having a valve chamber in which a valve body is arranged, an inflow outlet, and a communication hole communicating the valve chamber and the inflow outlet;
a rectification member arranged in the communication hole between the inflow outlet and the valve chamber,
wherein the communication hole has a bent portion in which a center line of the communication hole is bent, and the rectification member is arranged in the bent portion and has a corner portion formed by an inner circumferential surface bent or curved at an angle larger than an angle of the bent portion;
a drive mechanism to move the valve body via a valve shaft; and
a holder fixed to the valve main body and fixing the drive mechanism, wherein the rectification member is retained in the valve main body by the holder.

2. The valve device according to claim 1, wherein the bent portion is bent at an angle of 90 degrees.

3. The valve device according to claim 1, wherein:
at least two bent portions are provided,
the two bent portions are continuously arranged, and
the rectification member is arranged across the two bent portions.

4. The valve device according to claim 1, wherein:
the valve main body has a recess,
the rectification member has a fitting portion, and
the valve device further comprises a whirl-stop member to be fitted to the fitting portion and inserted into the recess.

5. A valve device comprising:
a valve main body having a valve chamber in which a valve body is arranged, an inflow outlet, and a communication hole communicating the valve chamber and the inflow outlet;
a rectification member arranged in the communication hole between the inflow outlet and the valve chamber,
wherein the communication hole has a bent portion in which a center line of the communication hole is bent, and the rectification member is arranged in the bent portion and has a corner portion formed by an inner circumferential surface bent or curved at an angle larger than an angle of the bent portion; and
a plug inserted into an opening of the valve main body to block the opening,
wherein the rectification member is retained in the valve main body by the plug.

6. The valve device according to claim 5, wherein the bent portion is bent at an angle of 90 degrees.

7. The valve device according to claim 5, wherein:
at least two bent portions are provided,
the two bent portions are continuously arranged, and
the rectification member is arranged across the two bent portions.

8. The valve device according to claim 5, wherein:
the valve main body has a recess,
the rectification member has a fitting portion, and
the valve device further comprises a whirl-stop member to be fitted to the fitting portion and inserted into the recess.

9. The valve device according to claim 5, further comprising a pipe provided outside the valve main body and having a curved shape,
wherein the pipe communicates with the communication hole.

10. The valve device according to claim 9, further comprising a fitting attaching portion separate from the valve main body:
wherein:
the pipe is connected with the fitting attaching portion on a side opposite to an end portion connected with the valve main body, and
the fitting attaching portion is fixed to the valve main body.

11. The valve device according to claim 10, wherein the pipe is connected with each of the valve main body and the fitting attaching portion by brazing.

12. The valve device according to claim 9, wherein material of the pipe and material of the valve main body are the same.

* * * * *